United States Patent [19]

Monot

[11] Patent Number: 5,708,778
[45] Date of Patent: Jan. 13, 1998

[54] AUTOMATIC CONFIGURATION OF PROTOCOL PARAMETERS IN PROTOCOL LAYERS FOR PUBLIC AREA NETWORKS

[75] Inventor: Philippe Monot, Meylan, France

[73] Assignee: Sun Microsystems, Inc., Mountain View, Calif.

[21] Appl. No.: 647,365

[22] Filed: May 9, 1996

[51] Int. Cl.$^6$ ................................................ G06F 13/42
[52] U.S. Cl. .......................... 395/200.1; 395/200.12; 395/712; 370/255
[58] Field of Search ................ 395/200.1, 200.12, 395/712, 651; 370/254–258

[56] References Cited

U.S. PATENT DOCUMENTS

| | | | |
|---|---|---|---|
| 5,165,018 | 11/1992 | Simor | 395/200.1 |
| 5,410,535 | 4/1995 | Yang et al. | 370/254 |
| 5,497,460 | 3/1996 | Bailey et al. | 370/258 |
| 5,502,818 | 3/1996 | Lamberg | 395/200.16 |
| 5,504,866 | 4/1996 | Hirasawa | 395/200.16 |
| 5,596,723 | 1/1997 | Romohr | 395/200.16 |

*Primary Examiner*—William M. Treat
*Attorney, Agent, or Firm*—Fenwick & West LLP

[57] ABSTRACT

A system and method automatically configures protocol layer parameters in terminal and carrier equipment. The system includes a terminal equipment having an automatic configuration program. The automatic configuration program controls the operation of the terminal equipment and sends a series of probe to the carrier equipment. Each probe is constructed to test a specific parameter value, and to restrict a set of potential values for the parameter. The automatic configuration program receives answers back from the carrier equipment, which may accept or reject, or not respond to the probe. Based on the the probe, any previous probes, the answer, any previous answers, and the set of values for the parameter, the automatic configuration program constructs another probe in accordance with another value of the parameter. This other value is determined by restricting the set of potential values that may be used to configure the parameter. The automatic configuration program thus, tests a plurality of the applicable parameter values for a parameter and iteratively narrows the set of potential values until the parameter value is established, or some error condition is encountered the prevent configuration of the parameter. This process is repeated for additional parameters, and then successive protocol layers.

16 Claims, 6 Drawing Sheets

AUTOMATIC CONFIGURATION OF PROTOCOL PARAMETERS IN PROTOCOL LAYERS FOR PUBLIC AREA NETWORKS

BACKGROUND

1. Field of Invention

The present invention relates generally to the field of network management, and more particularly, to systems and methods for configuring communication terminals and equipment for public networks.

2. Background of the Invention

Public networks and the configuration of terminals and communication equipment is known. Generally, public networks operate in conformance with the OSI network protocol layer model, and provide various implementations of the protocols, such as X.25, Frame Relay, ATM, ISDN, and the like. In a typical public network, such as a wide area network (WAN) or metropolitan area network (MAN), there is provided a user's device, conventionally known with respect to X.25 as a data terminal equipment (DTE), and a carrier device, known as a data communication equipment (DCE) which is used to connect the DTE to the network for communicating with other end point DTE's.

While the DTE is under the user's control, the DCE is typically under control of the network service provider. In order for the DTE and DCE to communicate properly, the DTE must be configured with the appropriate protocol parameters used by DCE. Conventionally, the configuration process is performed manually, with the systems administrator manually specifying parameter values for each of numerous different configuration parameters. This manual process is time consuming and error prone. In some cases system administrators do not have a basic understanding of what the parameters mean, and thus are unable to properly configure the DTE. In other cases where the systems administrators understand the various configuration parameters, they may not know, or have available information for establishing the correct configuration value. In most instances, the DCE parameters are set up at subscription time, which may be well before a particular DTE is configured, or the DTE may be set to default value that the systems administrator may not know.

Accordingly, it is desirable to provide a method and system that automatically configures a DTE or similar network device, thereby relieving the system administrator of this task, and ensuring a correct configuration.

SUMMARY OF THE INVENTION

The present invention provides a desirable system, method, and software product for automatically configuring data terminals and similar network devices. The present invention is based on the fact that when a DTE sends a packet, message, or other data to the DCE, and the packet is not properly configured, the DCE returns an error. The error is coded to specify the problem with the packet structure, packet sequence, or other nonconformity with the communication protocol. The error coding is generally documented in the protocol specifications, such as for X.25 protocol or the like. The present invention takes advantage of this information, and the known behavior of the DCE to determine the correct parameter values for the various configuration parameters.

In one aspect of the present invention there is provided a method for configuring parameters of a protocol layer within a terminal equipment device. A set of parameters is selected to be automatically configured. Each of these parameters has an initial set of potential values that may be used to configure the parameter, and from this set, one or more values correctly configure the DTE with respect to the DCE. The parameters may be selected from available protocol standards, and the range of potential values determined accordingly. The choice of which parameters to select is made by the system's implementer, and not necessitated by the invention.

A computer implemented method is then specified that performs three types of operations. First, the computer implemented method is capable of constructing for each parameter at least one probe that is to be sent from a terminal equipment device to a network equipment device to which it is communicatively coupled. The probe is based on the initial set of potential values for the parameter, any prior probes for the parameter, any answers received from the network equipment device in response to the any prior probes. A probe may include a number of probes.

Second, the computer implemented method is adapted to send the probe from the terminal equipment device to the network equipment device, and receive answers to the probe from the network equipment device.

Finally, the computer implemented method is capable of restricting a current set of parameter values that may be used to configure the parameter. This restriction is made on the basis of the initial set of potential values, on prior probes for the parameter, and prior answers received from the network equipment device in response to the prior probes.

This computer implemented method thus uses the series of probes and answers to iteratively restrict the current set of potential values for a parameter. This restriction occurs until a correct value of the parameter can be determined from the current set of potential values. At this point the parameter may be configured with a correct parameter value.

Finally, the computer implemented method is applied to the terminal equipment device to send at least one probe constructed in the manner described above for at least one parameter.

In another aspect of the present invention, there is provided an iterative probing technique that sends probes, whether packets, messages, frames, datagrams, or the like, from a DTE to a DCE. The DTE executes an automatic configuration program for performing the method. A probe structured with respect to a particular configuration parameter, such as packet size, format, and so forth. The probe is a function of the protocol parameter being configured, selected previous probes for that parameters, and selected answers to the previous probes that the DCE provided in response thereto. The DCE receives the probe and responds with an answer. The automatic configuration program determines from the probe, the answer, selected ones of the prior probes, and selected ones of the prior answers whether a value that correctly configures the parameter may be established. If not, another probe is created based on the parameter value of the probe, the prior probes, the answer, and the prior answers. This cycle is repeated until the parameter value is established, or it is determined that the parameter value cannot be established. The DTE then configures the next parameter in the same iterative manner. The probes may be structured to configure specific layers of the DTE communication protocols.

In another aspect the present invention is a software product in the form of a computer program memory resident in the DTE being configured or other computer connected thereto. The product incorporates data and procedural code to implement the probing technique of the present invention. Finally, in yet another aspect, the present invention is a computer system that automatically configures a DTE for communication with a DCE.

DETAILED DESCRIPTION OF THE INVENTION

System and Hardware Architecture

Figure 1:
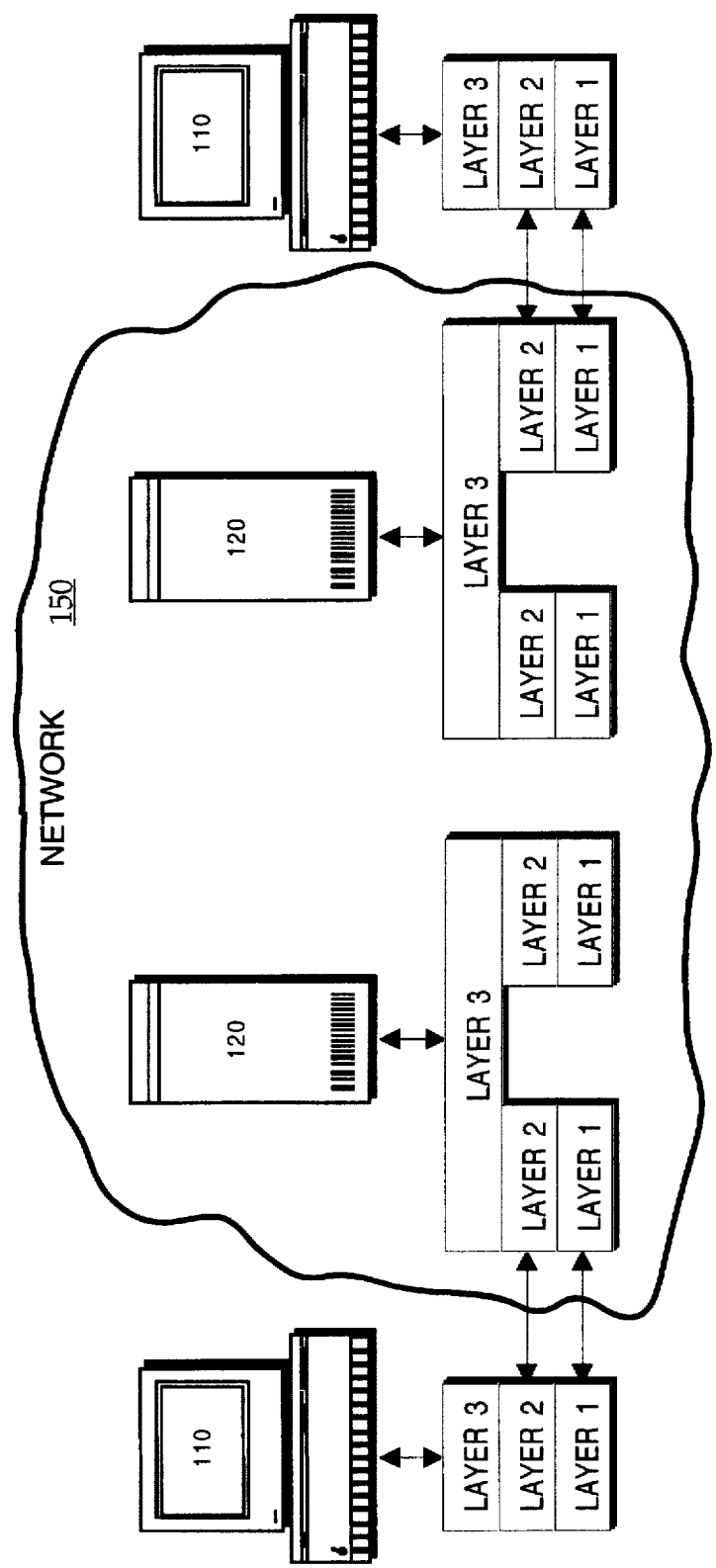
FIG. 1 is a block diagram of a system operating with the automatic configuration method of the present invention.

Referring now to FIG. 1, there is shown an illustration of a system for automatically configuring protocol layers. The system 100 includes a first DTE 110 conventionally connected through a network 150 to a DCE 120 for communicating with remote DCEs 120 and DTEs 110. The first DTE 110 may be a computer, router, terminal server, automatic call distributor, or similar device. The DTE 110 includes a processing device and a memory. Resident in the DTE memory is an automatic configuration program 140 for controlling the operation of the DTE 110 to conform with one method of operation embodying the present invention. The DCE 120 is conventional, and provides the interface for the DTE 110 to the public network 150. The terms "DTE" and "DCE" are used here to refer to the user's terminal equipment and the carrier's network equipment, respectively, and are not intended to be limited to only X.25 compliant systems.

Figure 2:
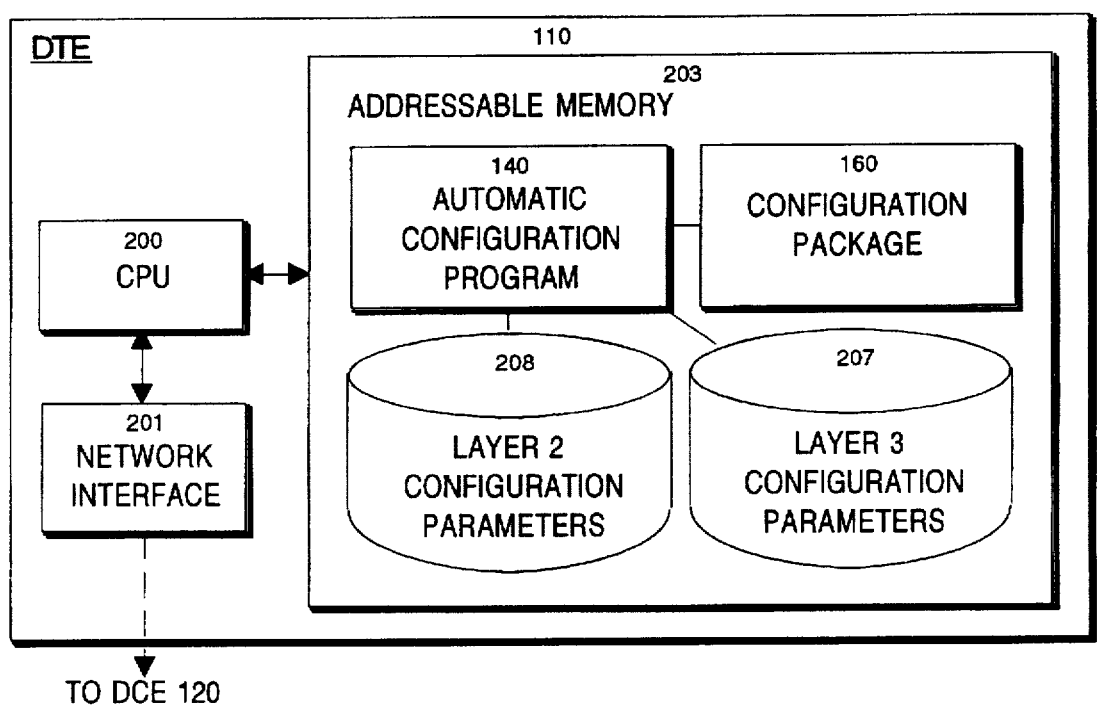
FIG. 2 is a block diagram of a data terminal equipment (DTE) configured with one embodiment of the automatic configuration program of the present invention.

Referring to FIG. 2, there is shown a block diagram of the relevant hardware architecture of a DTE 110 configured according to one embodiment of the present invention. The DTE 110 includes a processor 200 coupled to an addressable memory 203, such as RAM or ROM, and further coupled to a 20 network interface 201 for communication with a DCE 120. The addressable memory 203 includes an automatic configuration program 140 for controlling the operation of the processor 200 in accordance with the present invention. A configuration package 160 provides conventional configuration, and other facilities for the DTE 110. The addressable memory 203 includes at least one datastore 207 for layer 3 configuration parameters, and for layer 2 configuration parameters as further described below for use in configuring the protocol parameters. The configuration package 160 is here illustrated separately from the automatic configuration program 140; in other embodiments the automatic configuration program 140 may be integrated with the configuration package 160 to provide an improved version thereof. The automatic configuration program 140 may be provided to the DTC 110 on a computer readable memory, such as a CD-ROM, 8 mm tape, floppy diskette, or the like, for installation and execution thereon.

Operational Flow

Figure 3:
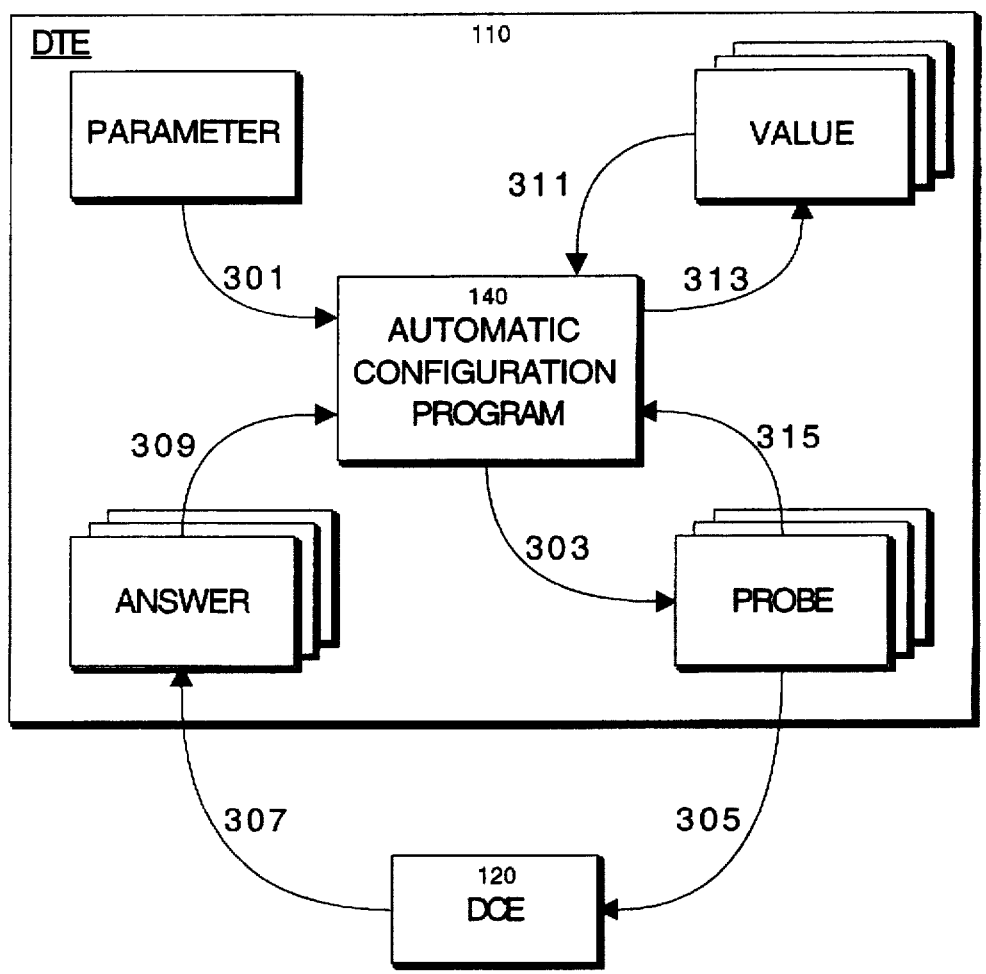
FIG. 3 is a flow diagram of the overall operation of the present invention.

Referring now to FIG. 3, there is shown a flow diagram of the overall operation of the present invention. A protocol is selected for automatic configuration, from which some number of parameters of the protocol are further selected. Computer encoded descriptions of the parameters are stored in a datastore, such as datastore 207. In FIG. 3 a single parameter is shown for ease of illustration. For the parameter there is an initial set of potential values that may be used to configure the parameter, also suitably stored in a computer readable datastore. Only a subset of these values will correctly configure the DTE 110 with respect to the DCE 120. The automatic configuration program 140 receives 301 this parameter, and is programmed to construct 303 for this parameter at least one probe. The probe may be comprised of series of probes.

The automatic configuration program 140 is further programmed to send 305 the probe to the DCE 120. The DCE 120 responds 307 to the probe with one or more answers. The automatic configuration program 140 receives 309 the answers, and restricts 313 the current set of potential values based on the set of probes that have been previously sent 305, and the set of answers received to any previous probes (309), and the existing set of potential values. Similarly, each probe is constructed by the automatic configuration program 140 based 311 on the current set of potential values for the parameter, probes that have been previously sent 305, and the set of answers received 309 to any previous probes.

This process is iterative, and continues until the automatic configuration program 140 is able to determine at least one value from the set of potential values that correctly configures the parameter, or that the parameter cannot be configured due to other factors.

Figure 4:
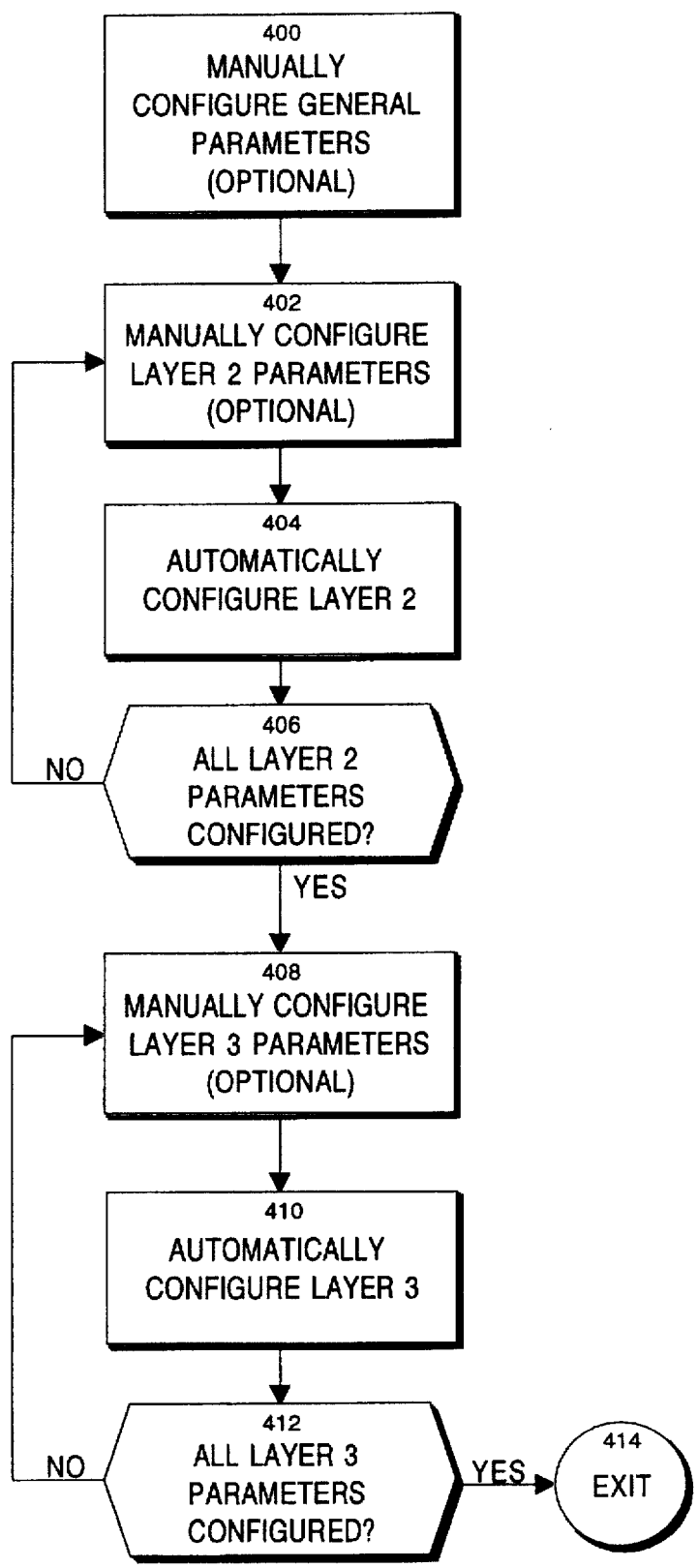
FIG. 4 is a flowchart of one embodiment of a method of configuring protocol parameters in conjuction with the automatic configuration program of the present invention.

Referring now to FIG. 4, there is shown a flowchart for configuring a DTE 110 in conjunction with one embodiment of the present invention. The user, such as a systems administrator, executes the configuration package 160 on the DTE 110 and manually configures 400 general parameters. General parameters are those for which a value is not established by the automatic configuration program 140, either because they cannot be established automatically based on an analysis of the protocol standard, or because the specific implementation of the program does not determine them. General layer 2 parameters may include, for example, the type of layer, such as LAP-B, LAP-D, and the like. General layer 3 parameters may include, for example, the local address of the DTE 110, such as its X.121 address or E.164 telephone number, the type of layer 3 protocol, such as X.25-3, Q.961, Q.933 and the like. The systems administrator thus also manually configures 402 layer 2 parameters for which a value is not established by the automatic configuration program 140. These steps provide the systems administrator the opportunity to complete and customize the configuration process if required. In some cases it is anticipated that the systems administrator configures very few parameters at all, such as X.121 address.

The automatic configuration program 140 then automatically configures 404 some number of layer 2 parameters. The configuration package 160 determines 406 whether all layer 2 parameters have been configured. If all the layer 2 parameters have not been configured, the systems administrator can again manually configured 402 any of the layer 2 parameters that were not capable of being automatically determined. The automatic configuration program 140 can again be used 404 to determine layer 2 parameters, this process repeating until layer 2 is configured.

Then the system administrator manually configures 408 layer 3 parameters. This step is also optional. Again, the automatic configuration program 140 automatically configures 410 some number of layer 3 parameters. If all layer 3 parameters have been configured, then the automatic configuration program 140 terminates 414. Otherwise, the systems administrator configures 408 the remaining layer 3 parameters. This process then repeats until layer 3 is fully configured.

Software Architecture

Figure 5:
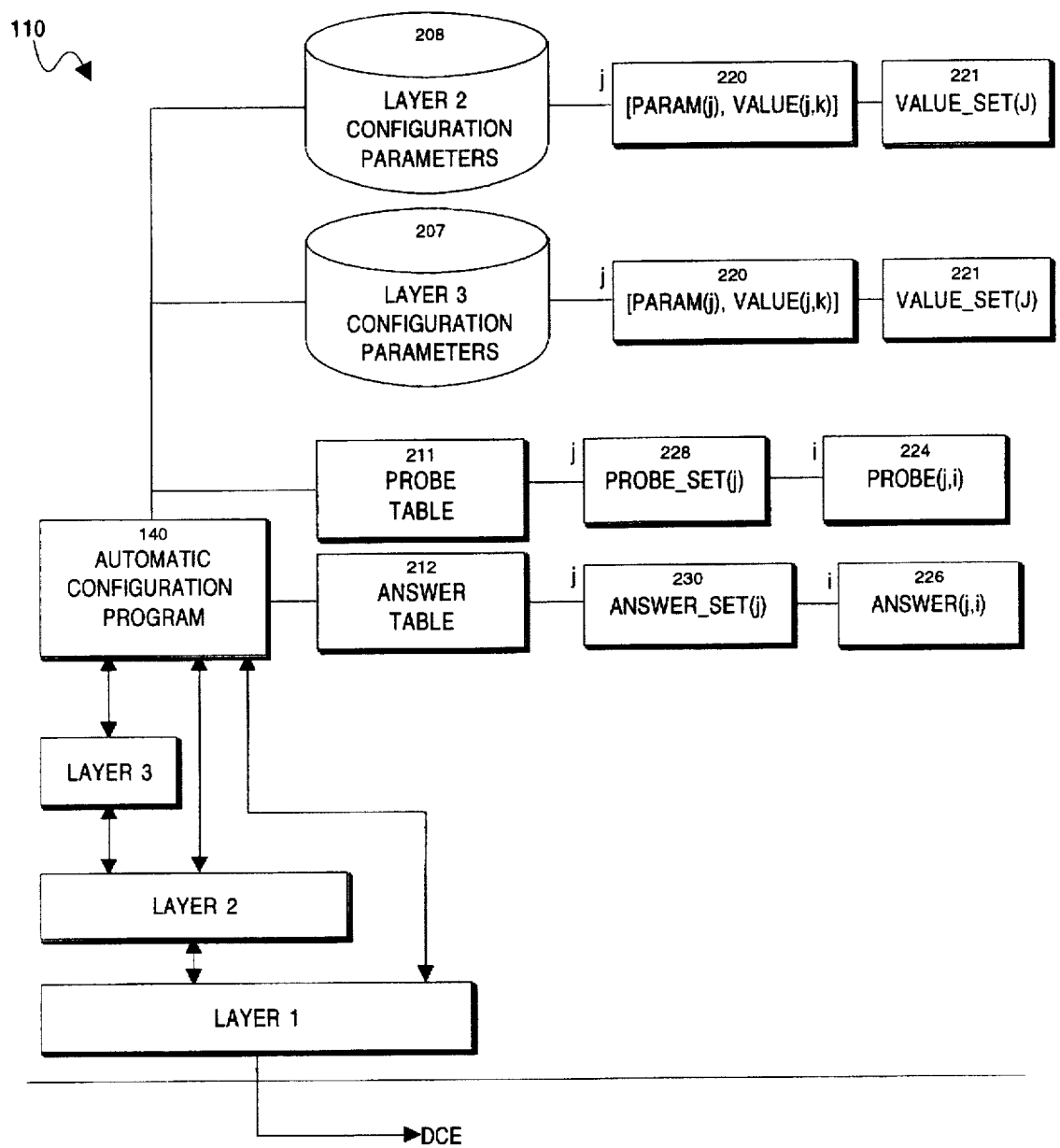
FIG. 5 is a block diagram of the software architecture of one embodiment of the automatic configuration program of the present invention, showing the relationships to the protocol layers.

FIG. 5 illustrates one embodiment of the software architecture of the automatic configuration program 140 used to configure layer 3 and layer 2 protocols.

Parameters and Values

There are m applicable parameters for a given layer. In each layer, each of the parameter is identified by PARAM(j), where j varies from 1 to m. For each parameter, any of a number of potential parameter values may be currently used by the DCE 120 of interest. This set of potential values is identified by VALUE_SET(j) 221, and the correct value in $VALUE_{13}$ SET(j) for the parameter PARAM(j) is identified by VALUE(j,k). $VALUE_{13}$ SET(j) 221 has some initial members, but is iteratively restricted by the automatic configuration program 140 until the automatic configuration program 140 is able to determine VALUE(j,k). Therefore, a final correct configuration for a given layer is a list 220 of {PARAM(j), VALUE(j,k)} pairs. In some instances, there may be several correct values for a given parameter. In this case, VALUE(j,k) is one of them, though not necessarily optimal. The restriction of values in $VALUE_{13}$ SET(j) 221 may be done by the removal of actual data values, the computation of a new range of values, the flagging of values as being inappropriate, or the like.

The automatic configuration program 140 maintains in the datastores 207, 208 the list 220 of parameters PARAM(j) of each layer that it is designed to configure; the list of parameters will ultimately include the value of each parameter. Additionally, the datastores may include a default value for selected parameters.

Probes and Answers

A probe (224) PROBE is a frame, packet, message, datagram, or the like, depending on the connection type and communication protocol, sent from the DTE 110 to the DCE 120. For instance, for ISDN networks, the probe is either an ISDN layer 2 frame, or an ISDN layer 3 data packet.

In some cases, a probe may include a sequence or set of individual probes. For example, for determining window size, a number of probes of acceptable content are sent to determine this single parameter.

A probe 224 is specifically constructed in an attempt to establish a value VALUE(j,k) for a PARAM(j). The $i^{th}$ probe 224 used to test parameter PARAM(j) is denoted PROBE (j,i). In constructing the probe 224, a value in the current set VALUE may be used as an actual data in the probe 224. For example, for an X.25 parameter such as the packet sequence modulo, a parameter value of "8" specifies that the network uses packet sequence ranging from 0–7 and a parameter value of "128" specifies that the network uses packet sequence numbers ranging from 0–127. In other cases, the value may be directly mapped to a internal value in the probe 224 to control the operation of the DCE 120. For example, bit fields are used for selecting which X.25 facilities are accepted by the DCE 120; the bits are interpreted by the DCE 120 to identify selected facilities.

In still other cases, a value in VALUE_SET(j) 221 is used to construct the probe 224, but is not used as data that is transmitted. For example, to establish the Maximum Frame Size parameter, a probe 224 is constructed with a number of bytes of user data, the number determined by the present values in VALUE_SET(j) 221 for this parameter. Thus, the value determines the overall structure of the probe, not a specifically included item of data.

The value VALUE(j,k) for a parameter PARAM(j) may be established in a variety of manners. For numeric type parameters having valid values over a range of values, a binary search, or other numerical search techniques may be used. Alternatively, $VALUE_{13}$ SET(j) 221 may be table of values, for example, ordered by frequency of use for the value. The probe 224 is then constructed by iterating through the table and selecting each value in VALUE_SET(j) 221 for the parameter in turn. A table of parameter values is also useful for parameters that take one or more flag values instead of free-ranging values. Here too, the table of parameter values may be ordered by frequency of use. Alternatively, a rule base may be established for determining the value of each parameter.

For each probe PROBE(j,i) sent to the DCE 120 of interest, an answer 226 is received and identified. An answer to a PROBE(j,i) is denoted ANSWER(j,i). This answer 226 may include no response from the DCE 120, due to a timeout in the automatic configuration program 140. An answer 226 may include the actual frame, or packet, or message or datagram or the like received from the DCE 120 of interest, and the time duration between the emission of the probe 224 and the reception of the answer 226 from the DCE 120.

In some cases, an answer 226 may include a sequence or set of individual answers 226.

A probe set 228 identifies the set of probes previously sent to the DCE of interest to configure a specific parameter PARAM. That is:

PROBE_SET(j)={PROBE(j,0), PROBE (j,1), . . . , PROBE((j,i)), . . . }

An answer set 260 identifies the set of answers 226 to the previous probes sent to the DCE 120 of interest to configure the parameter PARAM(j). That is:

ANSWER-SET(j)={ANSWER(j,0), ANSWER(j,1), . . . , ANSWER(j,i), . . . }

A probe PROBE(j,i) is constructed based on the parameter PARAM(j) for which the correct value needs to be determined, the set 228 of previous probes (PROBE_SET (j)), the set of answers 226 (ANSWER_SET(j)) to the previous probes, and the VALUE_SET(j) 221 that may be used to construct the probe. That is:

PROBE(j,i)=Fn (PARAM(j), PROBE_SET(j), ANSWER_SET(j), VALUE_SET(j))

The method used to build the PROBE(i) depends on the parameter to be configured.

State

Before sending the probe PROBE(j,i) to test a specific parameter PARAM(j), it is necessary to put the communication link between the DTE 110 and the DCE 120 in the relevant "state" appropriate for the testing of the parameter. This state is reached by sending appropriate frames, packets, or messages to the DCE 120 of interest, checking the answers 226 sent by the DCE 120 and in some cases waiting for a certain amount of time until some timers expire. This state is identified as STATE(j), and it is based on the parameter PARAM(j), the probe set PROBE_SET(j), and the answer set ANSWER_SET(j).

Method of Operation

Figure 6:
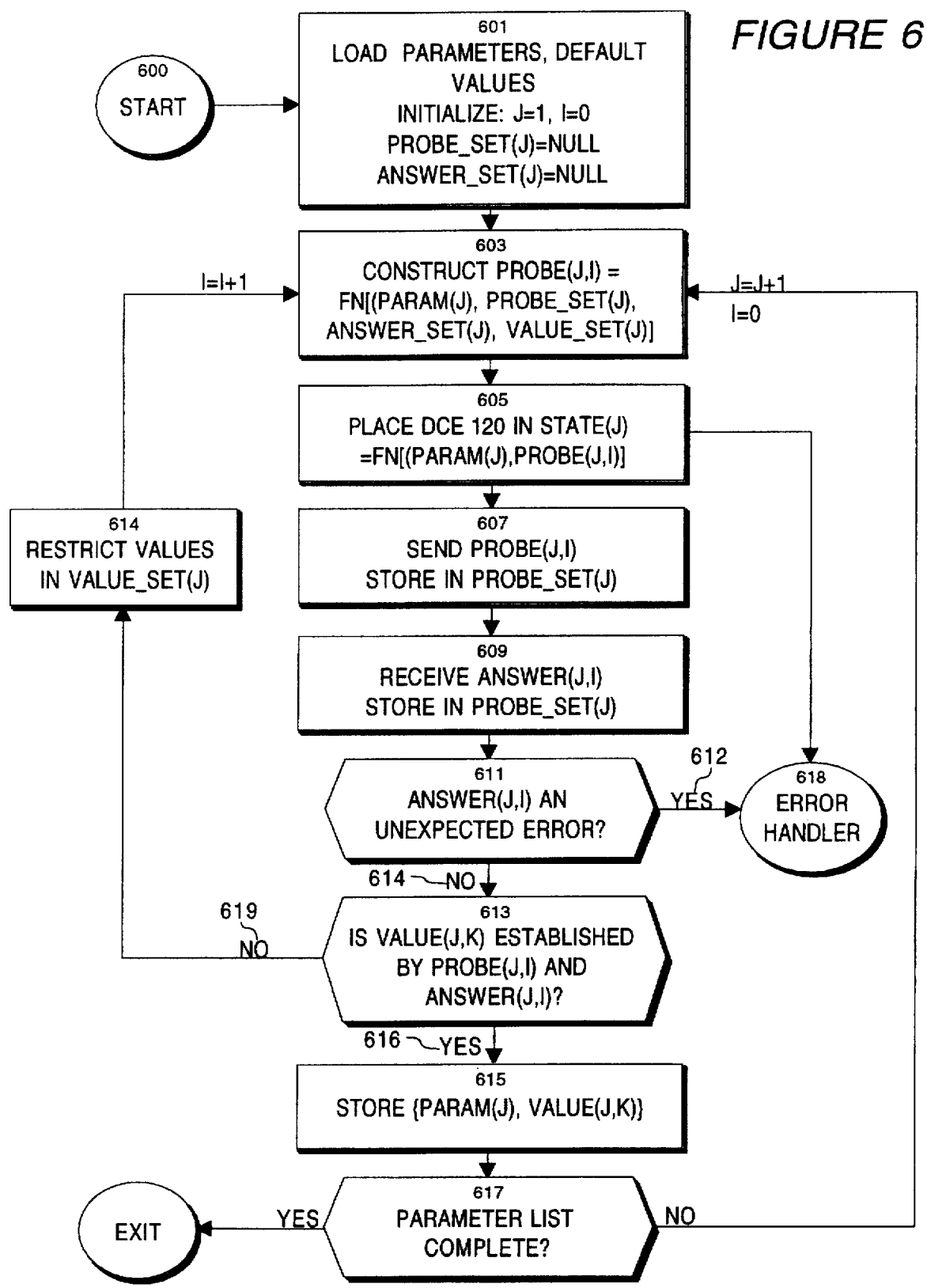
FIG. 6 is a flowchart of the operation of one embodiment of an automatic configuration program providing the configuration method of the present invention.

Referring now to FIG. 6, there is shown a flowchart for the operation of the automatic configuration program 140 to configure a specific layer, either layer 2 or layer 3. Upon startup 600 the automatic configuration program 140 loads 601 the appropriate parameters and default values (if any) from the layer 2 or layer 3 datastore 208, 207. Loop counter variables (i) and (j) are initialized to 0 and 1, respectively.

The automatic configuration program 140 traverses its parameter list 220 for the layer being configured from PARAM(1) to PARAM(m) using loop variable j.

Beginning with a first parameter PARAM(1), where j=1, the automatic configuration program 140 constructs 603 a probe 224, PROBE(j,i), according to the parameter PARAM (j), the set 228, PROBE_SET(j), of previous probes for the parameter, the set 230 of answers 226 to the previous probes, ANSWER_SET(j), and the current (here initial) set 221 of values VALUE_SET(j). Since this is the first probe, PROBE_SET(j) and ANSWER_SET(j) are empty. The new probe is stored in the PROBE_SET(j).

The automatic configuration program 140 establishes 605 the appropriate state STATE(j) between the DTE 110 and the DCE 120 by sending the appropriate frames, packets or messages to the DCE 120. The data to send the DCE 120 for the STATE(j) is a function of the parameter PARAM(j) being established, and the set of probes and answers. The DCE 120 responds with either expected behaviors or, unexpected behaviors, in which latter case an error handler 618 is called to indicate the error in establishing the connection state. Expected behaviors may include acknowledgments or particular error messages.

The automatic configuration program 140 then sends 607 the probe PROBE(j,i) to the DCE 120. Again, the probe is sent in the form appropriate for the network and layer type. The DCE 120 receives the probe and responds with one or more answers 226, ANSWER(j,i), which are either acknowledgments, expected errors, unexpected errors.

The automatic configuration program 140 receives 609 the answer 226, ANSWER(j,i) from the DCE 120. The answer is stored in the ANSWER_SET(j).

The automatic configuration program 140 tests 611 the received answer 226. The answer 226 ANSWER(j,i) may be any of the following three types:

Case 1 (612):
ANSWER(j,i) is an unexpected answer, that is, an answer 226 that is not valid from the definition of the protocol for the parameter PARAM(j) being configured, or even if otherwise valid, one that makes it impossible for the automatic configuration program 140 to establish the value of the parameter. Using LAP-B as an example, if the parameter being established is Maximum Frame Size, then the only answers of interest are an RR, Receive Ready acknowledging that the current probe 224 has a frame size that is less than or equal to the Maximum Frame Size, or FRMR, a FRaMe Reject, indicating that the probe 224 has a frame size greater than the maximum. An expected error would be a FRMR indicating an invalid frame size. However, an unexpected answer would be a UA answer 226. This answer would indicate that there is an invalid frame, given the state of the DCE 120. Because of this answer the automatic configuration program 140 is likely not able to configure the Maximum Frame Size parameter even if additional probes are sent.

Another example of an unexpected errors would be a timeout answer, where the DCE 120 does not respond at all. This is a valid "response," but instead of a protocol error, the problem may be physical, such as a disconnected cable. Here too, the automatic configuration program 140 will not be able to determine the value of the parameter from this answer 226 or from further probes. Either of these types of unexpected errors imply that it will not be possible to find a correct value VALUE(j,k) for the parameter PARAM(j), even by sending other probes.

In this case, the automatic configuration program 140 calls an error handler 618, the behavior of which is implementation dependent. For example, the error handler 618 may log an error message and ask for the user to manually enter 402 a value(s) for the parameter. Alternatively, the automatic configuration program 140 may skip the parameter, and continue with the next parameter PARAM (j+1).

If the answer 226 is not an unexpected error, then the automatic configuration program 140 tests 613 whether the value VALUE(j,k) for the parameter PARAM(j) can be established.

Case 2 (616):
ANSWER(j,i) is an answer 226 which allows the automatic configuration program 140 to determine the correct value VALUE(j,k) for the parameter PARAM(j). In other words, from current set 221 of values VALUE_SET(j), the set 260 of answers 226, ANSWER_SET(j), given to the set 228 of probes, PROBE_SET(j), at least one correct value VALUE(j,k) can be determined, in VALUE_SET(j) for the parameter PARAM(j). Threshold comparisons between the values in VALUE_SET(j) for different probes PROBE(j,i) and PROBE(j,i+1) may be used to determine if VALUE(j,k) has been reached. This is useful if the value of the parameter being established is numeric in type, and search techniques, such as binary search, are used. For non-numeric type values in a probe 224, such as flags or bit fields, an answer 226 that acknowledges the probe 224 may be used by the automatic configuration program 140 to determine the correct VALUE (j,k) for the parameters PARAM(j).

When VALUE(j,k) is determined, the automatic configuration program 140 stores 615 the pair {PARAM(j), VALUE (j,k)} in the parameter list 220 in the appropriate datastore, and determines 617 whether any other parameters remain to be configured. If so, the automatic configuration program 140 increments to the next parameter, PARAM(j+1), resetting the value counter (i) to zero.

As noted above, there may be several correct values in the current set 211 of VALUE_SET(j) for a given parameter. In this case, VALUE(j,k) is one of them, though not necessarily the optimal value of the parameter. Thus, even if one correct value is determined, the automatic configuration program 140 may optionally continue the loop in order to find a better value.

Case 3 (619):
ANSWER(j,i) is an expected answer 226 which does not allow the automatic configuration program 140 to determine a correct VALUE(j,k) in the current set 221 of VALUE_ SET(j) for the parameter PARAM(j). The automatic configuration program 140 may not be able to determine a correct value VALUE(j,k) because the process has not sufficiently restricted the solution space described in the current VALUE_SET(j).

An expected answer may be either an acknowledgement or even an error as specified in the relevant protocol standard, and as shown above with Maximum Frame Size example. An expected error typically occurs where the automatic configuration program 140 has successively changed the value of the parameter, for example using binary search, and previously received an acknowledgment of a probe. This indicates that the last probe, PROBE(j,i−1) constructed according to some value in VALUE_SET(j) was acceptable, but that the current probe PROBE(j,i) is rejected. Binary search, or other methods, can use this pattern of responses to determine the next probe.

In this case, it is necessary to restrict the set of possible values in VALUE_SET(j) that may be used to configure the parameter PARAM(j). Based on the current set 211 of values in VALUE_SET(j), the set 228 of probes in PROBE_SET (j), and the set 230 of answers ANSWER(j), the automatic configuration program 140 restricts 614 the set 221 potential values in VALUE_SET(j) that may be used for the next probe, PROBE(j,i+1). This restriction may be by binary search, as described, or iterative, rule based, or similar techiques.

From the current set 211 of value in VALUE_SET(j) then, the automatic configuration program 140 constructs 603 another probe, PROBE(j,i+1). The automatic configuration program 140 then reestablishes 605 the state of the DCE 120 and sends 607 the new probe PROBE(j,i+1).

This process repeats for until all parameters PARAMj, j=1 to m, have been configured, or have been determined to be not configurable by the automatic configuration program 140, due to the unexpected errors as described above, or for other reasons.

Example

An example of the automatic configuration program 140, using the X.25 layer 2 (LAPB) is as follows:

This example considers only the X.25 layer 2, "Maximum Frame Size" parameter (formally called the "Maximum number of bits in an I frame," or N1), which is the maximum number of bits that in information frame (I frame) can have in the information field. This frame size is a subscription parameter agreed between the DCE 120 and the DTE 110. The example focuses on the N1 parameter used for frames sent by the DTE 110 to the DCE 120.

The X.25 protocol specifies that on the reception of an I frame with an information field that exceeds the maximum established length N1, the DCE 120 sends a Frame Reject (FRMR) response frame with a Y bit=1. In addition, a frame size is between 8 and 4103 bytes.

Assume that the Maximum Frame Size for a given DCE 120 is 3500 bytes. Initially VALUE_SET={0 . . . 4103 } and an initial value of 2050 is an element of the set. In order to determine this parameter automatically, the automatic configuration program 140 uses the following steps:

603: Construct a valid I frame with an information field of a valid number of bytes (PROBE(j,0)), here 2050.

605: Place the LAB-P link in the information transfer state, which is the only valid state where I frames can be sent and received. To do that:

The DTE 110 sends DISC command to the DCE 120 (with P bit=1).

The DCE 120 answers 226 with either a UA or a DM response. If another answer 226 is received, there is an error condition, and error handler 618 is called.

The DTE 110 sends a SABM/SABME command to the DCE 120 (with P bit=1).

The DCE 120 sends a UA response. Otherwise, there is an error condition, and again the error handler 618 is invoked.

607; Send the I frame constructed above, PROBE(j,0).

609; Receive an answer, ANSWER(j,0).

611–613: Test ANSWER(j,0). The result is:

(619) An I frame or RR frame that acknowledges the sent I frame (PROBE(j,0)). At this point the value of the N1 is not established. It is only known that N1>=2050 bytes.

614: Restrict VALUE_SET(j) to {2050 . . . 4103} bytes.

603: Construct another probe, PROBE(j,1) with 3075 in the information field; 3075 :=2050+((4100 −2050)/2).

605: Reestablish state of the layer 2 link.

607: Send the probe PROBE(j,1) with the I frame.

609: Receive an answer, ANSWER(j,1).

611–613: Test ANSWER(j,1). The result is:

(619) An I frame or RR frame that acknowledges the sent I frame (PROBE(j,1)). At this point the value of the N1 is not established. It is only known that N1>=3075 bytes.

614: Restrict VALUE_SET(j) to {3075 . . . 4103} bytes.

603: Construct another probe, PROBE(j,2) with 3582 bytes in the information field; 3583 :=3075+((4100−3075)/2).

605: Reestablish state of the layer 2 link.

607: Send the probe PROBE(j,2) with the I frame.

609: Receive an answer, ANSWER(j,2).

611–613: Test ANSWER(j,2). The result is:

(619) An FRMR frame which rejects the sent I frame with the Y bit set to 1. N1 is still not established. It is only known that 3075<=N1<3538 bytes.

The automatic configuration program continue to loop with a binary search for the number of bytes in the information field, until by restriction 614, VALUE_SET(j) contains one single element where (n<=N1<n+1). Then, the correct value for the parameter N1 is n.

During the above process, any other frame received 609 (i.e. not an RR or FRMR) or a timeout may be an error. In this case, the DCE 120 does not send an answer 226 that is compatible with the automatic configuration of the maximum frame size, that is indicating an error in frame size. In this instance, the answer indicates an error condition (618) that can be handled for instance by logging an error and skipping to the next parameter.

Binary search, or other numeric techniques are appropriate where the value VALUE(j,k) of a parameter PARAM(j) is in a variable numeric range. For other types of parameters, the value VALUE(j,k) may be one of a number of flags. In this case, simple iteration through the set of flag may be used to determine the appropriate value for the PARAM(j).

During the automatic configuration of a given layer (N), the information exchanged at the upper (N+1) layers can interfere with the test. In the example mentioned above, the I frame that is used as a probe at the layer 2 may, for example, contain an invalid layer 3 packet. If the layer 3 packet is X.25, the DCE 120 may send an answer 226 with an I frame (layer 4) which contains a layer 3 Restart packet. In most of the cases, the automatic configuration program 140 can ignore these side effects as long as it establishes the correct state for the DCE 120 before sending the next probe.

As described with respect to the FIG. 4, it may be the case that some parameters cannot be configured automatically this way. The user then manually enters 402, 408 the values for a subset of parameters. When all parameters have been configured, the automatic configuration program 140 terminates.

I claim:

1. A method for automatically configuring at least one parameter of a protocol layer in a terminal equipment device coupled to a network equipment device, the method comprising:

selecting a set of parameters to be automatically configured, each parameter having an initial set of potential values from which at least one value must be used to correctly configure the parameter;

creating a computer implemented method that:
constructs for each parameter at least one probe to be sent from the terminal equipment device to the network equipment device to restrict a current set of potential values of the parameter, the probe constructed according to the intial set of potential values, any prior probes for the parameter, and any answers received from the network equipment device in response to any prior probes;

sends each such probe from the terminal equipment device to the network equipment device and receives an answer to the probe from the network equipment device until it is determined whether at least one correct value of the parameter may be established from the current set of potential values;

restricts the current set of potential values, from which the at least one value must be used to correctly configure the parameter, according to the initial set of potential values, prior probes for the parameter, and prior answers received from the network equipment device in response to the prior probes; and, applying the computer implemented method to the terminal equipment device to send at least one probe for at least one parameter.

2. The method of claim 1 wherein the computer implemented method constructs each probe additionally according to the current set of potential values.

3. The method of claim 1 wherein the computer implemented method restricts the current set of potential values from which the at least one value must be used to correctly configure the parameter according to a previous set of potential values.

4. A computer implemented method of determining a value of a protocol parameter for a protocol layer in a connection between a terminal equipment device and a network equipment device, comprising;

a) constructing a probe based on the parameter, selected ones of any previous probes, and selected ones of any previous answers received to such probes;

b) sending the probe from the terminal equipment device to the network equipment device;

c) receiving an answer from the network equipment device;

d) determining from the probe, the answer, selected ones of previous answers, and selected ones of previous probes, whether a value of the parameter that correctly configures the parameter is established;

e) repeating steps a) through d) until a value of the parameter is established, or it is determined that a value cannot be established.

5. The computer implemented method of claim 4, wherein step a) further comprises:

a.1) restricting a current set of potential values of the parameter based on a current value of the parameter, selected ones of any previous probes, and selected ones of any previous answers received to such probes; and, a.2) constructing the probe based on the current set of potential values of the parameter.

6. The computer implemented method of claim 5 wherein the current set of potential values from which the at least one value must be used to correctly configure the parameter is further restricted according to a previous set of potential values.

7. The computer implemented method of claim 1, further comprising:

f) responsive to establishing a value of the parameter, selecting a next parameter to configure and returning to step a).

8. The computer implemented method of claim 4, wherein a probe includes a set of probes.

9. The computer implemented method of claim 4, wherein a probe comprises a data communication message.

10. The computer implemented method of claim 9, wherein a probe comprises a layer two frame.

11. The computer implemented method of claim 9, wherein a probe comprises a layer three packet.

12. The computer implemented method of claim 4, wherein constructing a probe comprises performing a binary search in the current set of potential values for a next value of the parameter.

13. The computer implemented method of claim 4, wherein constructing a probe comprises selecting one of a plurality of fixed values as the value of the parameter, and constructing the probe to include the fixed value.

14. A computer readable memory storing a computer program that controls a processor to configure at least one protocol parameter in a terminal equipment device according to the method of claim 4.

15. A computer system for configuring at least one protocol parameter in a terminal equipment device that is coupled to a network equipment device, the computer system comprising:

a processor;

a memory coupled to the processor and storing therein a computer program executable by the processor for performing the steps of:

a) constructing a probe based on a selected parameter, selected ones of any previous probes, and selected ones of any previous answers received to such probes;

b) sending the probe from the terminal equipment device to the network equipment device;

c) receiving an answer from the network equipment device;

d) determining from the probe, the answer, selected ones of previous answers, and selected ones of previous probes, whether a value of the parameter that correctly configures the parameter is established;

e) repeating steps a) through d) until a value of the parameter is established or it is determined that a value cannot be established.

16. The computer system of claim 15 wherein constructing a probe comprises:

a.1) restricting a current set of potential values of the parameter based on a current value of the parameter, selected ones of any previous probes, and selected ones of any previous answers received to such probes; and, a.2) constructing the probe based on the current set of potential values of the parameter.

* * * * *